Jan. 27, 1925.
B. GRANVILLE
ARMORED TIRE
Filed July 26, 1920  2 Sheets-Sheet 1
1,524,177
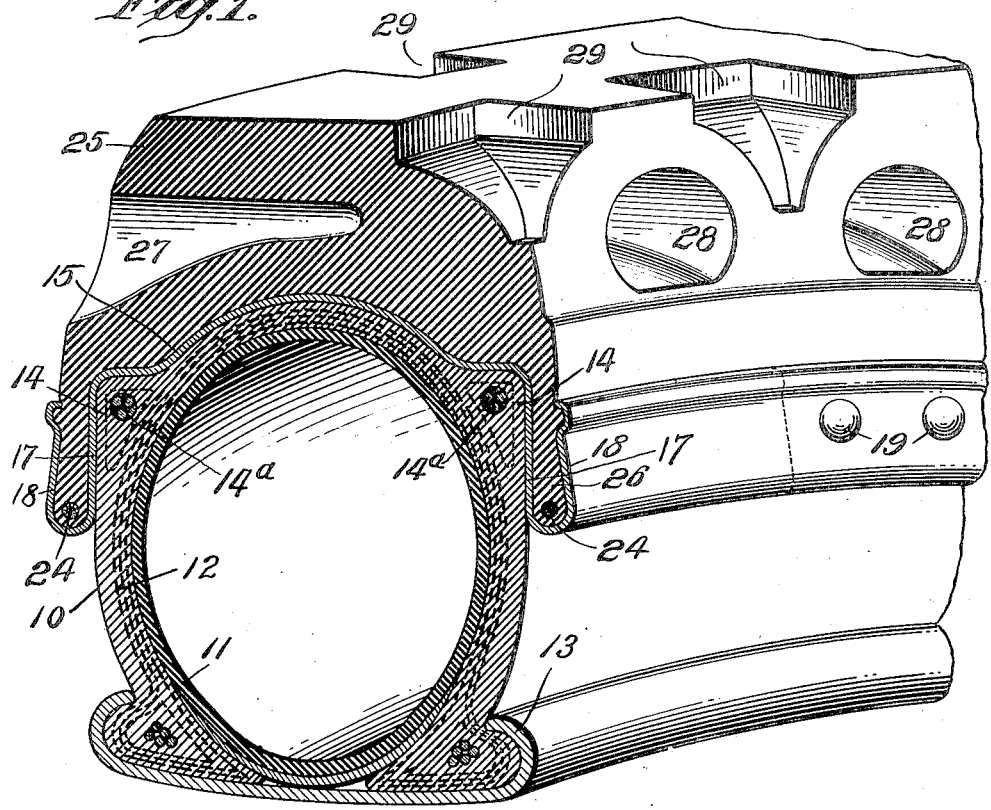
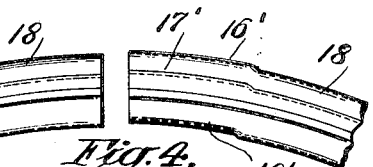
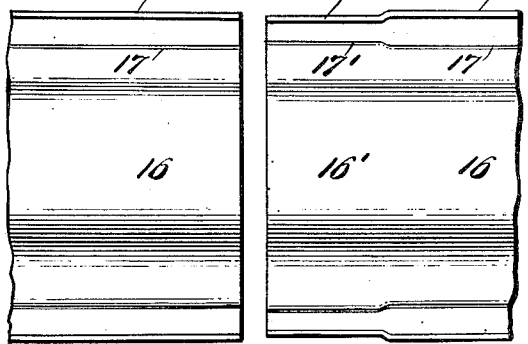
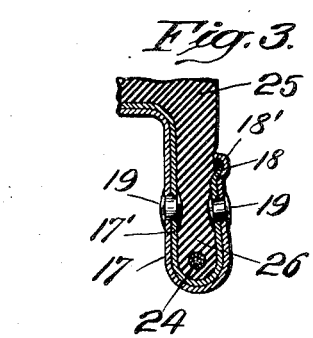
Inventor
Bernard Granville
By Arthur L. Keit
his Atty.

Inventor
Bernard Granville
By Arthur L. Kent
his Atty.

Patented Jan. 27, 1925.

1,524,177

UNITED STATES PATENT OFFICE.

BERNARD GRANVILLE, OF NEW YORK, N. Y.

ARMORED TIRE.

Application filed July 26, 1920. Serial No. 399,018.

*To all whom it may concern:*

Be it known that I, BERNARD GRANVILLE, a citizen of the United States, residing at New York city, in the county of New York and State of New York, have invented certain new and useful Improvements in Armored Tires, fully described and represented in the following specification and the accompanying drawings, forming a part of the same.

This invention relates to armored tires for automobiles and other vehicles. In U. S. Patent No. 1,213,096, granted to me January 16, 1917, there is described and claimed an armored pneumatic tire comprising a flexible annular inflatable body and a floating rigid armor rim mounted on the periphery of said body and carrying a cushion tread, said rim having inwardly extending side flanges approximately parallel to the plane of the axis of the tire and the flexible body being formed to fit within and to bear outwardly against said side flanges. The present invention has been made especially with the idea of improving the tires disclosed in said patent and in my U. S. Patent No. 1,338,011, dated April 27, 1920, and includes features of general application to armored tires. The present invention relates particularly to the form and construction of the armor rim and of the cushion tread carried by such rim.

I have discovered that by making the inwardly extending side flanges of the armor rim double by upturning the edge portions of the flanges to extend parallel, or approximately so, with the inwardly extending portion, the rim may be given the requisite strength and rigidity with the use of much lighter material than was necessary in the construction illustrated in my Letters Patent No. 1,213,096. I have found also that by spacing the upturned edges from the inwardly extending portion of the flanges so as to form continuous annular pockets surrounding the rim a number of important advantages are obtained. The doubling of the flange and forming of such pockets make it possible to obtain a strong and rigid joint at the ends of the rim while making use of a rim of much thinner material than was necessary to obtain the necessary strength at the welded joint shown in my previous patent. The pockets also provide for the means for mechanically locking the tread to the rim. They also make possible the use of cables extending within the pockets around the rim, which add materially to the strength of the rim and aid in making it possible to form the rim of relatively light material.

The present invention also involves means for increasing the effective tractive grip of the tire upon the road surface. Ordinary pneumatic tires contact with the road surface over a considerable distance owing to the flattening of the tire at its bottom point under the pressure of the weight of the vehicle. A rigid rim on a pneumatic tire body prevents such flattening of the pneumatic body and consequently tends to lessen the tractive grip by decreasing the contact with the ground. According to the present invention, the compressibility of the tread covering the rigid rim is increased so that despite the presence of the rigid rim, contact with the ground over a considerable distance is secured, giving a tractive grip similar to that obtained with an ordinary pneumatic tire without sacrificing the advantages obtained by the armored rim.

In order that my invention may clearly be understood, I will describe in detail the embodiment of it shown in the accompanying drawings; in which—

Fig. 1 is a perspective view of a tire incorporating the invention in the form in which I consider most desirable, showing a transverse section of the tire and the wheel rim upon which it is mounted.

Fig. 3 is a fragmentary transverse section taken on the line 3—3 of Fig. 2;

Fig. 4 is a fragmentary side view of the ends of the armor rim of the tire shown in Figs. 1 and 2 before the ends are joined;

Fig. 5 is a fragmentary top view of the parts shown in Fig. 4;

Figure 2:
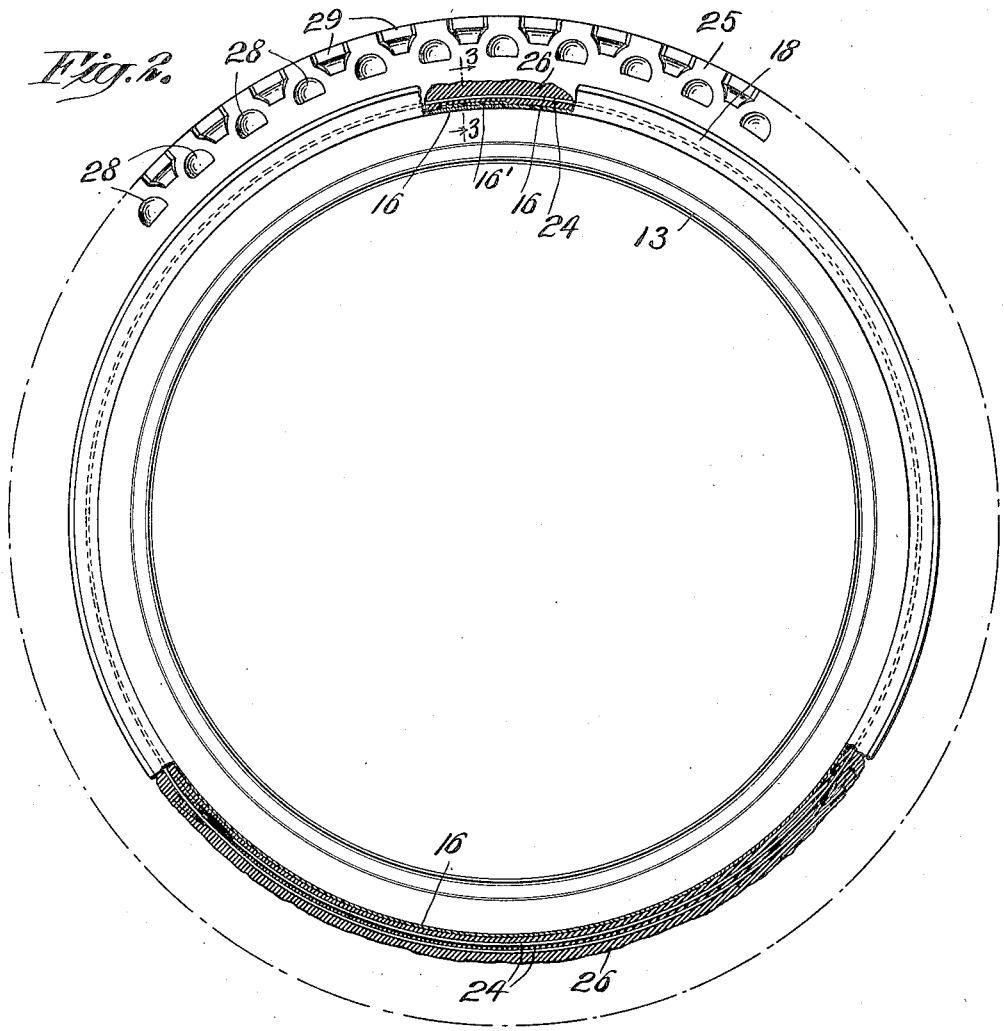
Fig. 2 is a side view of the tire and rim shown in Fig. 1 partly broken away to show the means for connecting the ends of the armor rim and the anchoring of the ends of the wire cable.

The tire shown in Figs. 1, 2 and 3 comprises an annular tubular inflatable body 10 and a floating armor rim 15 mounted on the periphery of said body and provided with a cushion tread 25. The body as shown is of the form shown in my Patent No. 1,213,096 and 1,338,011 above referred to, comprising an inner air tube 11 and an outer casing 12 of rubber and fabric formed to be mounted on a metal rim 13 of the wheel felly, the body in the particular form shown being of the usual clincher type with its edges formed to engage the inturned edges of the clincher rim 13. The peripheral or outer portion of the body casing 12 is shaped to fit within the channel of an armor rim having approximately parallel side flanges, being for this purpose formed with circumferentially extending outwardly projecting portions or ribs 14 forming shoulders to fit between the rim flanges and having peripheral faces to bear against the outer flat parts of the rim and side faces to bear against the rim flanges, said side faces being approximately parallel to each other and to the plane of the axis of the casing. The side faces of the ribs or shoulders 14 and the inner sides or faces of the rim flanges thus provide oppositely engaging circumferentially extending faces by which the rim 15 is held against lateral displacement relatively to the body 10. The fabric for giving strength to the body casing should extend about the casing substantially parallel with the inner surface thereof as indicated in the drawing, and the ribs or shoulders 14 should be stiffened, as by means of wires 14ª, to prevent the casting of the rim when the tire is deflated.
The floating armor rim 15 is a rigid channel rim comprising an intermediate portion 16, having most desirably a central outward bulge as shown, and side flanges 17 extending inwardly approximately parallel to the plane of the axis of the tire. The flanges are made double by upturning their edge portions 18 to extend approximately parallel to the inwardly extending portions 17. The edge portions 18 are spaced from the main portions of the flanges 17 so as to form continuous external pockets extending around the flanges. For reasons hereinafter explained, the pockets most desirably taper slightly so as to be somewhat narrower at their mouths than at their bottoms.

The rim 15 is best made of a strip of such length that its ends overlap. At one end the central portion 16 is offset outwardly at 16' and the main portions of the flanges 17 are offset outwardly at 17' and the edge portions 18 are offset inwardly at 18', so that the offset portion 16' fits over the opposite end of the central portion 16 and the offset portions 17' and 18' of each flange fit between the two portions of the opposite ends of the flanges 17, (Figs. 4 and 5). Rivets 19 secure the overlapping flange portions 17 and 18, and in addition to the rivets, the overlapping ends of the rim are joined by brazing. The brazed joint prevents any possible relative movement of the overlapping ends which would tend to shear the rivets 19, so that a strong rigid annulus is obtained without welding. If preferred, however, the overlapping portions of the rim may be welded and riveted together or welded without riveting. The use of the form of rim described makes it possible to produce a connection of great strength between the ends of the rim, while at the same time the strength of the entire rim is materially increased by the doubling back of the edge portion of the flanges, making possible the use of much thinner material for the rim than could otherwise be used.

The tread 25 covers the outer surface of the armor rim 15 and has integral inwardly extending flanges 26 which are molded in and fill the pockets between the main portions of the flanges 17 and their edge portions 18. In making the tread, a larger proportion of sulfur is put in the rubber forming the flanges 26 than in that forming the outer portion of the tread, so that the outer portion of the tread is relatively soft and flexible, while the flanges 26 are relatively hard. The flanges 26 taper slightly outwardly toward their ends to correspond with the taper of the pockets, so that the flanges 26 serve to lock the tread 25 to the floating rim 15.

A wire cable 24 is embedded in the flanges 26. The ends of the cable 24 overlap, as shown in Fig. 2, and the cable 24 is preferably made of woven strands which are flared out at their ends so as to anchor the ends of the cable firmly within the rubber of the flanges 26. The cable thus forms in effect a strong annulus, giving the flanges greater resistance to deflection, and adding materially to the strength of the rim 15.

Figure 6:
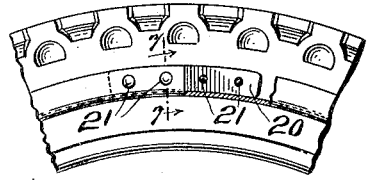
Fig. 6 is a fragmentary side view of the tire and wheel rim partly broken away and showing a modified form of connection between the ends of the rim.
Figure 7:
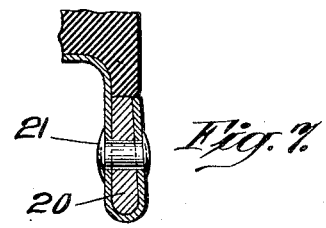
Fig. 7 is a fragmentary transverse section taken upon the line 7—7 of Fig. 6.

In the modification shown in Figs. 6 and 7, the offset portions 16', 17', 18' are omitted, and the opposite ends of the portions 16, 17 and 18 of the rim are brought into abutting relation. Seated in each flange pocket and extending across the juncture of the abutting ends of the rim is a connecting piece 20. The connecting pieces 20 fit closely within the pockets and are joined to the main flange portions 17 and the upturned edge portions 18 of the flanges by means of rivets 21. In addition to the fastening provided by the rivets, the connecting pieces 20 are brazed to the flanges and the abutting ends of the rim may also be brazed together, or the parts may be welded together.

In order to render the tread 25 compressible so as to give it a grip upon the road similar to that obtained by an ordinary pneumatic tire, it is provided with transverse recesses or holes 27, 28, entering it from opposite sides. Each of the holes 27, 28, tapers inwardly and extends beyond the central plane of the tread. The holes 27 and 28 are placed in staggered relation so that their inner ends do not run together. Indentations 29 are formed in the outer edge of the tread between the holes 27 and 28 respectively, the indentations on each side of the tread being between the holes on the same side and transversely opposite the holes on the opposite side of the tread. As appears from the section shown in Fig. 1, the construction described provides a tread which is readily compressible for the purpose specified, and at the same time provides an outer surface which tends to prevent skidding.

My invention is by no means limited to the exact forms shown, as it is apparent that many modifications may be made without departing from the spirit of the invention. Thus the doubling of the flanges is of itself an important feature which may be utilized without spacing the edge portions of the flanges from the inwardly extending portions. The advantages obtained by the cable extending around the pockets may be had without filling the pockets with an extension of the tread. If the cables are not embedded in extensions of the tread, it is, of course, necessary that their ends should be joined together in some other suitable manner. In such case, also, it is, of course, necessary that the cables lie in the bottom of the pockets instead of slightly above the bottom as shown in the drawings. Even when the tread extensions are used and the cable is embedded in them, the cable may if desired be placed in the bottom of the pockets.

While I have mentioned some of the modifications which may be made in the forms shown, I shall not attempt to catalog all the modifications which can be made without departing from my invention.

What is claimed is:

1. An armored pneumatic tire, comprising a flexible annular inflatable body, and a floating rigid armor rim mounted on the periphery of said body, said rim consisting of a metal annulus having an intermediate peripheral portion consisting of a single layer of material, and inwardly extending side flanges approximately parallel to the plane of the axis of the tire and doubled back to form outer flange portions extending approximately parallel to the inner flange portions, and the flexible body having its peripheral portions formed to fit between and bear outwardly against said side flanges.

2. An armored pneumatic tire, comprising a flexible annular inflatable body, and a floating rigid armor rim mounted on the periphery of said body, said rim consisting of a metal annulus formed with inwardly extending side flanges approximately parallel to the plane of the axis of the tire, and the flexible body having its peripheral portions formed to fit between and to bear outwardly against said side flanges, the edge portions of the rim flanges being doubled back approximately parallel to their inwardly extending portions, spaced off therefrom and extending to form external pockets of relatively large depth and relatively small width, and a cushion tread covering the peripheral face of said rim and having extensions lying within said pockets.

3. An armored pneumatic tire, comprising a flexible annular inflatable body, and a floating rigid armor rim mounted on the periphery of said body, said rim consisting of a metal annulus formed with inwardly extending side flanges approximately parallel to the plane of the axis of the tire, and the flexible body having its peripheral portions formed to fit between and to bear outwardly against said side flanges, the edge portions of the rim flanges being doubled back to extend approximately parallel to their inwardly extending portions and spaced off therefrom to form external pockets, and a cushion tread of relatively soft rubber covering the peripheral face of said rim and having integral flanges of relatively hard rubber extending into said pockets, and a cable embedded within and extending completely around each of said tread flanges and having its ends anchored therein.

4. An armored pneumatic tire, comprising a flexible annular inflatable body, and a floating rigid armor rim mounted on the periphery of said body, said rim consisting of a metal annulus formed with inwardly extending side flanges approximately parallel to the plane of the axis of the tire, and the flexible body having its peripheral portions formed to fit between and to bear outwardly against said side flanges, the edge portions of the rim flanges being doubled back to extend approximately parallel to their inwardly extending portions and spaced off therefrom to form external tapering pockets, and a cushion tread of relatively soft rubber covering the peripheral face of said rim and having outwardly tapering flanges of relatively hard rubber extending into and fitting closely within said pockets.

5. An armored pneumatic tire, comprising a flexible annular inflatable body, and a floating rigid armor rim mounted on the periphery of said body, said rim consisting of a metal annulus formed with inwardly extending side flanges approximately parallel to the plane of the axis of the tire, and the flexible body having its peripheral portions formed to fit between and to bear outwardly against said side flanges, the edge portions of the rim flanges being doubled back to extend approximately parallel to their inwardly extending portions, and an annular tension resisting member within said flanges between the inner and outer portions thereof.

6. In an armored tire, a floating rigid rim consisting of a metal annulus having an intermediate peripheral portion consisting of a single layer of material, and inwardly extending side flanges approximately parallel to the plane of the axis of the tire and doubled back to form outer flange portions extending approximately parallel to the inner flange portions.

7. In an armored tire, a floating rigid rim having inwardly extending side flanges approximately parallel to the plane of the axis of the tire, the edge portions of the flanges being double back approximately parallel to their inwardly extending portions, spaced off therefrom and extending to form external pockets of relatively large depth and relatively narrow width, and a cushion tread covering the peripheral face of said rim and having extensions lying within said pockets.

8. In an armored tire, a floating rigid rim having inwardly extending side flanges approximately parallel to the plane of the axis of the tire, the edge portions of the flanges being doubled back to form outer flange portions extending approximately parallel to their inwardly extending portions and spaced off therefrom to form external pockets, a tread covering the peripheral face of said rim and having continuous extensions lying within said pockets, and a tension cable in each of said pockets.

9. In an armored tire, a floating rigid rim having inwardly extending side flanges whose edge portions are turned back and extended to form tapering external pockets having their greatest widths near their inner ends, and a tread covering said rim and having outwardly tapering flanges extending into said pockets.

10. In an armored tire, a rigid floating rim having inwardly extending side flanges whose edge portions are turned back to form external pockets, and a tread having a portion of relatively soft rubber covering the periphery of said rim and flanges of relatively hard rubber extending into said pockets.

11. In an armored tire, a rigid floating rim having inwardly extending side flanges whose edge portions are turned back to form external tapering pockets, and a tread having a portion of relatively soft rubber covering the periphery of said rim and outwardly tapering flanges of relatively hard rubber extending into said pockets.

12. In an armored tire, a rigid floating rim having inwardly extending side flanges with back-turned edge portions forming external pockets, a tread having a portion of relatively soft rubber covering the periphery of said rim and integral flanges of relatively hard rubber extending into said pockets, and a cable embedded in and extending completely around each of the flanges of said tread and having its ends anchored therein.

13. In an armored tire, a floating rigid rim having inwardly extending side flanges with back-turned edge portions approximately parallel to the inwardly extending portions of said flanges, the end portions of said flanges overlapping and being connected together.

14. In an armored tire, a floating rigid rim having an intermediate peripheral portion and inwardly extending side flanges with back-turned edges extending approximately parallel to the inwardly extending portions of said flanges, the intermediate portion and the inwardly extending and edge portions of the flanges at one end of said rim being offset and overlapping the other end of the rim and being attached thereto by rivets passing through said flange portions and by brazing.

15. In an armored tire, a floating rigid rim having an intermediate peripheral portion and inwardly extending side flanges with back-turned edge portions forming pockets, the intermediate portion and the inwardly extending and edge portions at one end of said rim being offset and overlapping the other end of the rim and being attached thereto by rivets passing through said flange portions and by brazing.

16. In an armored tire, a floating rigid rim having inwardly extending side flanges with back-turned edge portions forming pockets and having its ends overlapping and attached together, and a cable lying within and extending completely around each of said pockets.

17. In an armored tire, a rigid floating rim having inwardly extending side flanges whose edge portions are turned back to form continuous external pockets, and having its ends overlapping and attached together, a tread covering the peripheral face of said rim and having flanges extending into said pockets, and a cable embedded in each of the flanges of said tread and extending around each of said pockets and having its ends anchored within said flanges.

18. A rigid armor tire rim consisting of a metal annulus having in intermediate peripheral portion consisting of a single layer of material, and inwardly extending side flanges approximately parallel to each other and each doubled back to form outer flange portions extending approximately parallel to the inner flange portions.

19. A rigid armor tire rim having inwardly extending side flanges approximately parallel to each other, the edge portions of the flanges being doubled back to extend approximately parallel to their inwardly extending portions and spaced off therefrom to form external tapering pockets having their greatest widths near their inner ends, and provided with a cushion tread of relatively soft rubber covering the peripheral face of the rim and having outwardly tapering flanges of relatively hard rubber extending into and filling said pockets.

20. A rigid armor tire rim having inwardly extending double side flanges approximately parallel to each other, the edge portions of the flanges being doubled back to form outer flange portions extending approximately parallel to their inwardly extending portions, and provided with an annular tension resisting member within each of said flanges between the inner and outer portions thereof.

21. In an armored tire, a floating rigid rim having inwardly extending side flanges with back-turned edge portions forming pockets, and a fastening piece lying in each pocket and extending across the abutting ends of the rim and riveted and brazed to said flanges.

22. In an armored tire, a floating rigid rim having inwardly extending side flanges whose edge portions are turned back to form external pockets, a fastening piece lying in each pocket and extending across the abutting ends of the rim, and a tread covering the periphery of the rim and having extensions filling the space in said pockets not occupied by said fastening pieces.

In testimony whereof I have hereunto set my hand in the presence of two subscribing witnesses.

BERNARD GRANVILLE.

Witnesses:
EDGAR W. BURR,
H. L. KENT.